Inventor.
Harry G. Yetter.

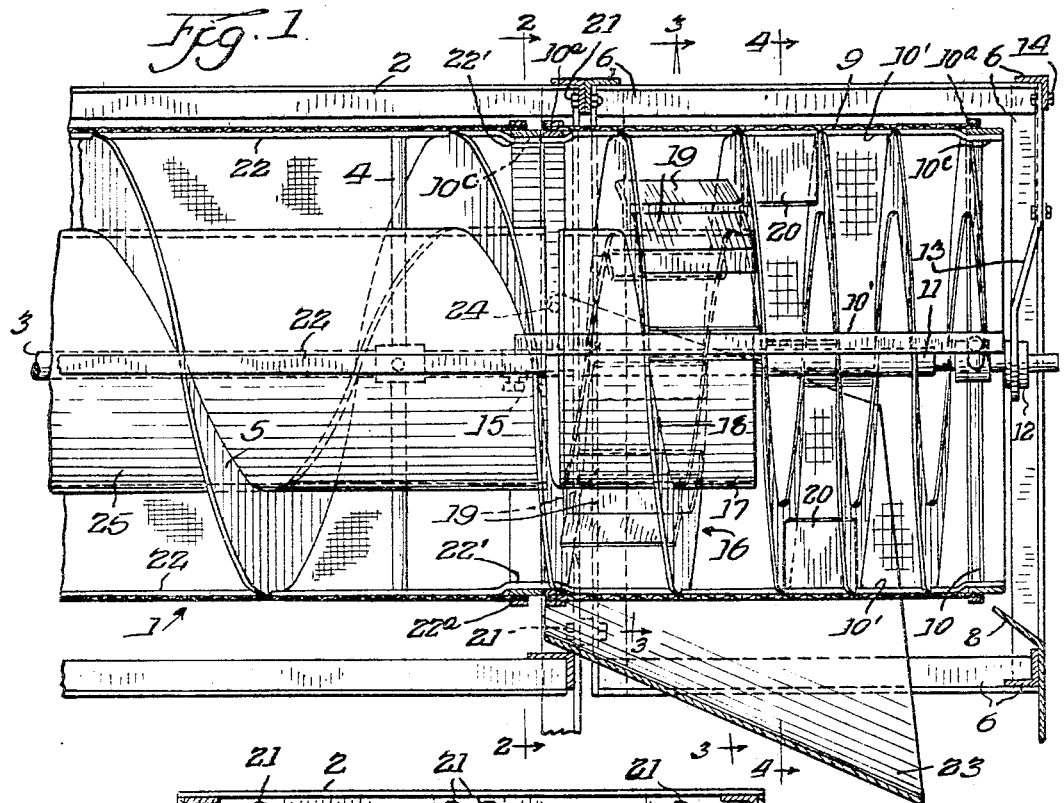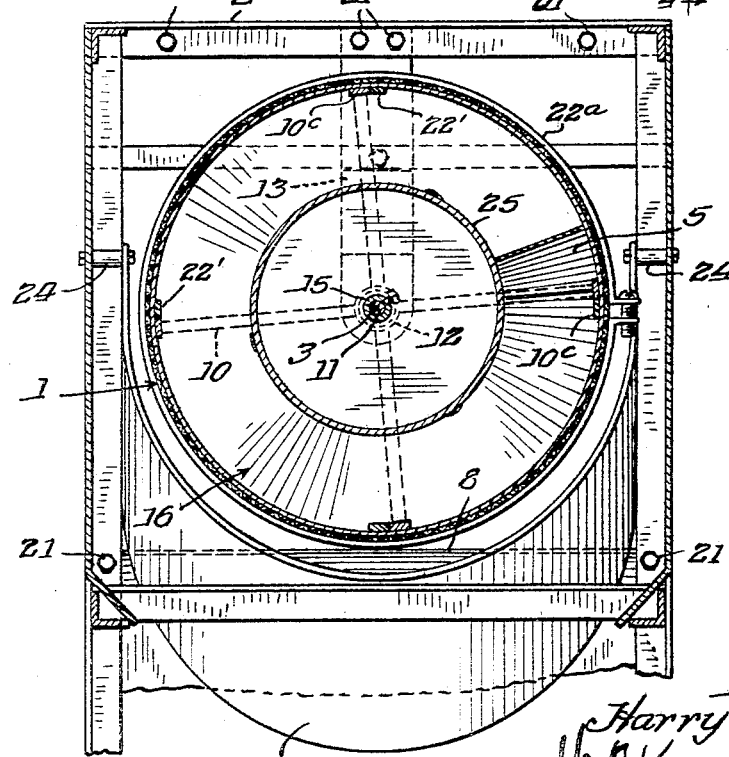

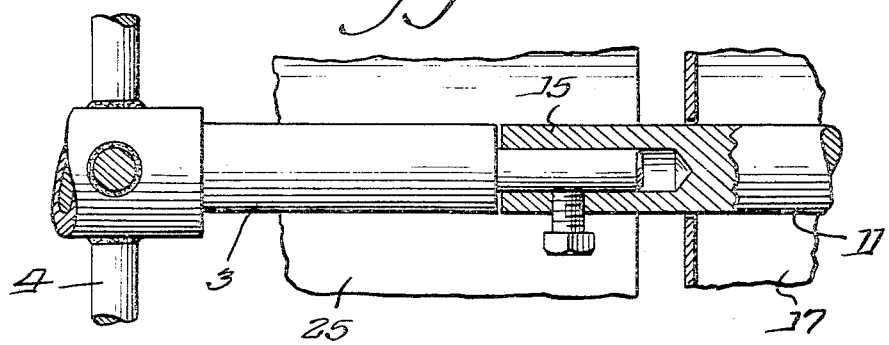
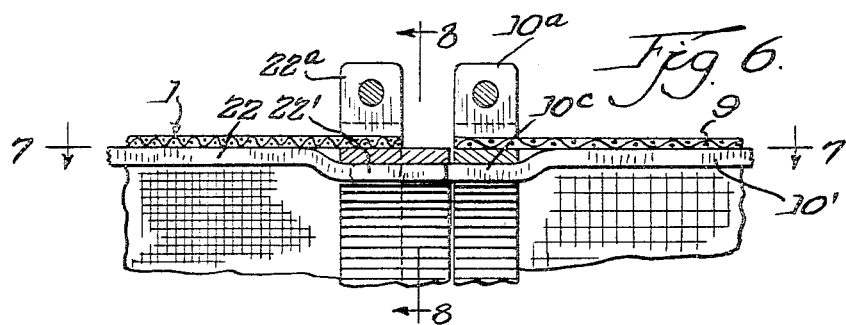
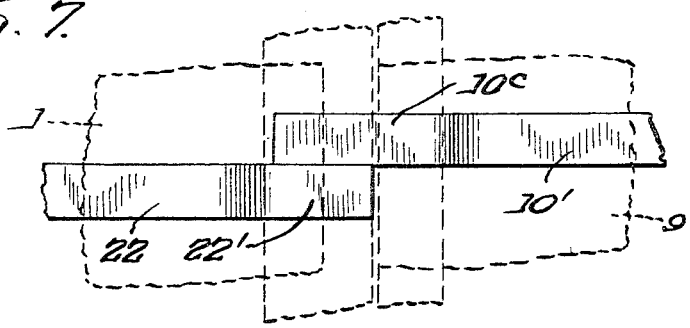
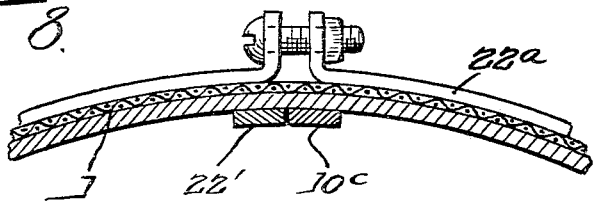

United States Patent Office 3,483,975
Patented Dec. 16, 1969

3,483,975
SUPPLEMENTAL SEPARATOR FOR GRAIN
CLEANING MACHINES
Harry G. Yetter, Colchester, Ill., assignor of one-half to
Joseph Whalen and Joan Whalen
Filed May 3, 1968, Ser. No. 726,462
Int. Cl. B07b 1/24
U.S. Cl. 209—297
2 Claims

ABSTRACT OF THE DISCLOSURE

A supplementing attachment for grain cleaners and separators having a rotatable perforate or screen cylindrical drum with opposed material inlet and outlet ends, an imperforate drum of less diameter fixedly mounted in concentrically spaced relation therein and rotatable therewith carrying an auger or spiral flight, a portion of which has spaced transversely disposed bucket blades fixedly mounted therebetween. The invention is attachable to or may be an integral part of the kind or type of separator or grain cleaning machine illustrated, described and claimed in my pending application for patent Ser. No. 677,007, filed Oct. 19, 1967.

Figure 3:
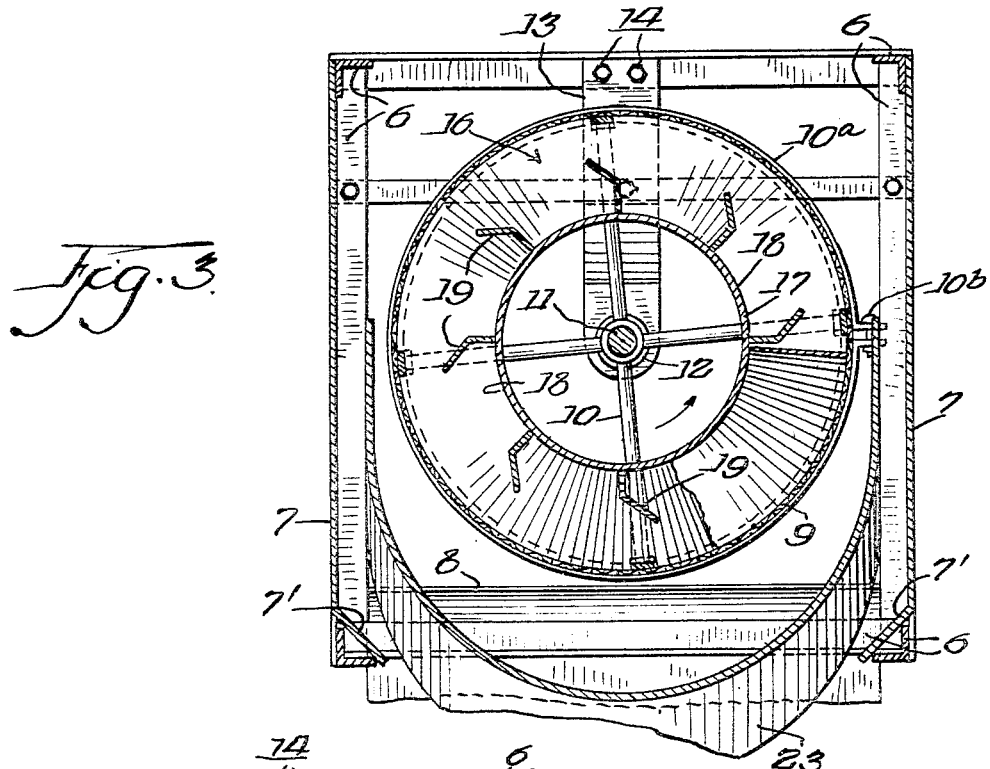

This invention relates to improvements in machines for cleaning grain, id est, machines which will function to separate by sifting and cleaning various kinds of grains, including shelled corn kernels, chaff, "fines," cob and other fragments, weeds, etc., whereby to assure their satisfactory preservation and storage, also, food usage of the nutriment containing "fines" and germs.

Background of the invention

Prefatorily stated, it has long been recognized to be highly desirable to store clean edible grains in a minimum of storage area and in a manner which will ensure their effective aeration, preservation and retention of the beneficial values thereof, plus economies in storage charges; also, to recover food valuable "fines" etc. therefrom, advantageous for use, per se, or as components of prepared foods for both humans and animals, hence, affording a maximum yield. Such is particularly true of shelled corn kernels whereby the germs and "fines" separated from kernels broken or cracked especially during shelling, will be recovered rather than lost.

The state of the art, including prior known apparatus, undoubtedly represent the extent of its development and while including rotary sifting devices for separating and cleaning different characters of flowable dry or partially dry materials, it is lacking in or for the above stated accomplishment.

The terms "grains" or "edible grains" as herein used mean corn (maize), wheat, rye, barley, and other cereal plants.

In view of the developed prior art and the need for advance and improvement therein, hereinbefore briefly noted, as will be apparent from a further perusal of this specification, the following are considered to be and are important objects of the invention.

A primary object, is to provide a device, attachable to or an integral part of my aforesaid grain separator and cleaner, which when oeprated (rotated) in conjunction therewith, will engage, agitate and move those materials delivered thereinto from said cleaner and separator in a manner that will make positive disseminated discharge thereof onto and over a maximum and effective sifting area of its perforate or screen separating drum, hence, assure effective separation by complete drum sifting action and prevent movement or travel clogging or inertia of the same with resultant material reduction of cleaning and separating efficiencies.

It is also an object of the invention to provide a device of the stated character wherein the materials (grains, etc.) delivered thereinto will be successively and repeatedly engaged and moved in orbital or partially orbital paths about and over the separating drum, this to ensure positive and effective sifting, cleaning and separation of the grains or other materials and progressive travel thereof longitudinally therethrough for ultimate discharge therefrom.

A further object of the invention resides in providing to and within the rotatable separating drum a co-rotatable auger or spiral flight in which the centers of the convoluted blades or vanes thereof are lessened or decreased in the direction of the drum discharge whereby to effect a slower longitudinal travel and a materially increased and prolonged agitation and orbital flow of materials (grains, etc.) onto and longitudinally over said drum, hence, increasing its material cleaning and separating efficiency.

These and other objects of my invention will become apparent from the following disclosure when read in conjunction with the appended claims and accompanying drawings.

In the drawings:

FIGURE 1 is a vertical longitudinal section through the invention showing it operatively connected to the similarly illustrated discharge end portion of the type of grain cleaning and separating machine described and claimed in my pending application Ser. No. 677,007; also showing a possible modification thereof or addition thereto wherein an imperforate drum, such as used in the sifting and cleaning body of the invention, is mounted in the machine body.

Figure 4:
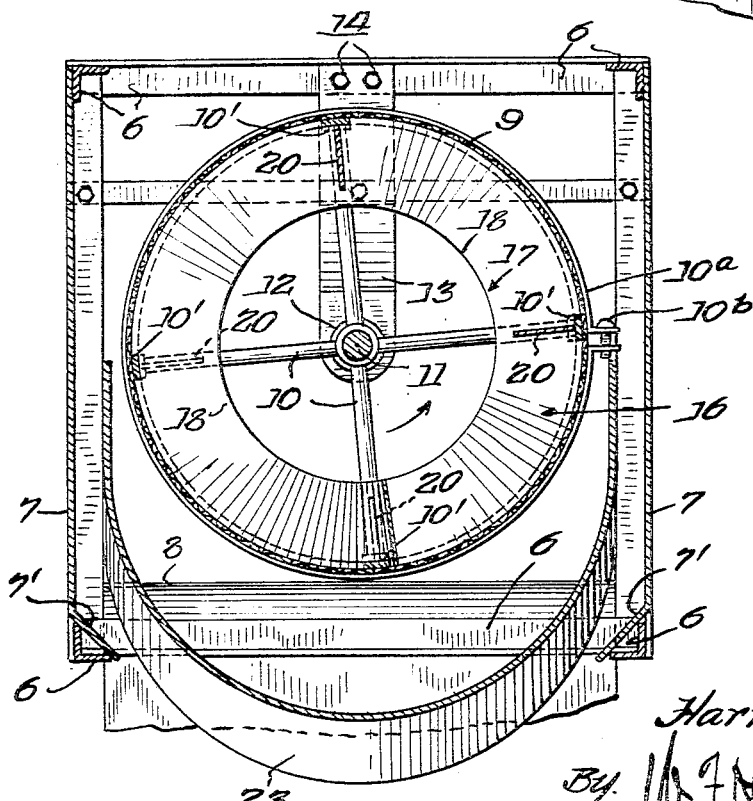

FIGURE 2 is a vertical transverse section taken on the line 2—2 of FIGURE 1 looking in the direction in which the arrows point, FIGURE 3 is a section taken on the line 3—3 of FIGURE 1 looking in the direction in which the arrows point, FIGURE 4 is a section taken on the line 4—4 of FIGURE 1 looking in the direction in which the arrows point, FIGURE 5 is an enlarged fragmentary detail, partly in section, showing the coupling between the shaft of the grain cleaning and separating machine (driving) and the shaft of the invention (driven), FIGURE 6 is an enlarged fragmentary detail in vertical longitudinal section showing a portion of the connection between the grain sifting body of the equipped machine and the like body of the supplementing attachment (the invention), FIGURE 7 is an enlarged fragmentary face side of top view of the connection shown in FIGURE 6 with the wire mesh removed, and FIGURE 8 is an enlarged detail in vertical section taken on line 8—8 of FIGURE 6 looking in the direction in which the arrows point.

With continued reference to the drawings wherein like parts throughout the several figures are identified by the same reference numerals, the invention, as heretofore stated, is adaptable to and used in conjunction with the type of grain sifting and separating machine described and claimed in my pending application for United States patent Ser. No. 677,007, filed Oct. 19, 1967. Said machine includes, in part, a foraminated open ended drum-like grain sifting and sparating body 1 which can be made of suitable gauge wire mesh (hardware cloth) concentrically supported on a suitable frame 2 journaled shaft 3 extending longitudinally therethrough, by spaced spiders 4. A spiral or auger flight 5 of length and diameter substantially corresponding to that of the drum-like body is positioned and fixedly supported therein extending from one end to the other thereof.

The invention comprises a substantially box-like frame consisting of interconnected angle-iron pieces generally indicated by the numeral 6, the opposite sides of which are preferably closed by fixed metal sheets 7 whose lower end portions are inwardly disposed or flanged, as at 7'; to assure downward directing and discharge of separated grains. A similarly formed chute deflector plate 8 is fixedly mounted on the frame lower and outer angle-iron piece for obvious purpose.

An open ended cross sectionally circular shaped drumlike sifting and separating body 9 of diameter and shape substantially corresponding to that of the body 1, preferably made of wire mesh (hardware cloth) of gauge greater than that of the machine sifting body is received about and supported by longitudinally disposed metal bars or strips 10' carried on the outer ends of the arms of a spider 10 mounted on and rotatable with a shaft 11 disposed longitudinally of and medially therethrough. To secure the mesh about the metal bars and assure its retention in cylindrical form, as described, spaced split metal bands 10ª are engaged over and above it, interconnected in clamping relation by bolt 10ᵇ. The outer end of the shaft is journaled in a bearing 12 carried on the lower end of a hanger arm 13 secured at its upper end to an intermediate portion of the adjacent transverse frame angle-iron frame piece 6, as at 14.

Rotary driving motion is imparted to the shaft 11 by effecting a coupling connection 15 between it and the machine shaft 3. Thus, the inner end of the shaft, and in consequence, the spider 10 carrying the sifting and separating drum-like body 9 are adequately supported.

A spiral or auger flight 16 is positioned within and disposed longitudinally of the sifting and separating body 9 throughout its length. The outer edge portions of its convolutions are notched and engaged over and with adjacent portions of the bars 10'. Thereby, fixed connection is effected between said body 9 and the flight. Thus, they will be collectively rotated by the driven shaft 11.

The centers of the convolutions of the spiral flight are progressively lessened as they approach the open and outer discharge end of the foraminated body 9, as shown in FIGURE 1, the purpose of which is hereinafter described.

An imperforate cylindrical drum 17, having a closed or walled normally inner end, of length and diameter less than that of the sifting and separating body 9 is arranged therewithin in substantially concentric and spaced relation thereto. It is received snugly in and partially through the auger flight, approximately spanning the distance between the first two convolutions thereof, in the manner shown in FIGURE 1 of the drawings. If desired, spot welds 18 may be made between adjacent portions of the drum periphery and the flight convolutions whereby to assure its fixed positioning. Its closed normally inner end is substantially flush with relation to the open inner end of the sifting and sparating body 9, while the free end of the innermost flight convolution is juxtaposed and substantially contiguous with that of the machine auger flight 5, the purpose of which will hereinafter become apparent.

Reltaively spaced angularly formed buckets or blades 19 are fixedly mounted between and transversely of those flight convolutions adjacent and about the drum 17, being of depth less than the spacing between the drum and the inner periphery of the perforate body 9 (wire mesh). Other and relatively opposed, but plane, transverse blades 20 of depths substantially corresponding to the buckets 19 are arranged between certain of the remaining flight convolutions, i.e., those beyond the imperforate drum, being fixedly mounted on the bars or strips 10', as by welding or equivalent means.

To effect connection between the frames of the grain cleaning and separating machine and the invention (the frame of the implementing attachment), the latter is endwise and matchingly positioned with respect to the former, as shown in FIGURE 1. Coupling 15 is effected between the driving and driven shafts 3 and 11. Thereupon, the adjacent ends of the frames are interconnected by engaging bolts 21 through the adjacent angle-iron pieces. The adjacent end portions of the metal bars or strips 10' of the body 9 and those of the machine body 1, indicated at 22, are extended, inwardly offset, as at 10ᶜ and 22', respectively, and arranged in side-by-side relation as shown in the enlarged fragmentary FIGURES 6, 7 and 8. The adjacent end portions of the wire mesh of the bodies 1 and 9 are extended thereover into substantially abutting engagement. Thereupon, the split metal band 10ª is engaged and clamped about the adjacent end of the body 9 and a similar band 22ª is engaged and clamped about the adjacent end of the machine body 1.

In order that corn kernels or other grains sifted through and from the wire mesh of the implementing attachment body 9 will be directively discharged, a trough 23 is positioned thereunder (see FIGURE 1). It is supported on and by adjacent the lower portion of the frame 2 having upper portions of its opposite sides bolted or otherwise connected to the machine frame, as at 24.

If it should be desired or required, the invention equipped machine body 1 may have an imperforate drum 25 mounted in and disposed longitudinally thereof for its entire length or a portion thereof. The function and/or utility thereof corresponds to that of the hereinbefore described imperforate drum 17 mounted in the sifting and cleaning body 9 of the invention. This added imperforate drum will extend through the auger flight 5 of the machine and is connected thereto.

Assuming that my supplementing attachment for the aforesaid grain sifting and cleaning machine has been connected to the discharge end thereof in the manner shown in FIGURE 1 of the drawings, and is being rotated, flowable matter (grains of different kinds including shelled corn) will have been traveled through the sifting and separating body 1. The "fines" included therein will have been sifted through and from the same and the residual matters, including grains and dross matters, will be discharged therefrom into the intake end of the supplementing attachment (the invention) sifting and separating body 9. It will be engaged and moved longitudinally of and through said body by the auger flight 16, over this sifting and separating perforate body, the perforations of which, or the gauge of its mesh body, are larger than those of the body 1, i.e., slightly larger than the average size of the particular grains (corn, wheat, etc.) being sifted, cleaned and separated. As the flowing matters are moved by the auger-flight longitudinally of the body 9 toward the discharge end thereof, they will be initially engaged by its wider spaced convolutions, impinging upon the periphery of the imperforate drum 17 and engaged by angularly formed buckets or blades 19 mounted therebetween. Being so engaged they will be carried in an orbital path and positively directed onto and over the said perforate body in disseminated or scattered form. In consequence, a maximum sifting and recovery of the grains or kernels will be effected; bulking accumulation of the matters in the bottom of the body prevented. Continuing their longitudinal travel, the residuals will be engaged by and between the closer spaced and remaining convolutions and the blades 20. Thereby, the remaining grains or kernels particularly, those which are outwardly of the drum 17 adjacent or in proximity to the rotating perforate body 9 will be further dispersed or disseminated and sifted through the body perforations or mesh. Also, because of the closer relationing of the remaining convolutions, the longitudinal passage or travel of the grains or kernels outwardly of the perforate body will be slowed, resulting in an increased time of dissemination and separation thereof. Dross residual matters, as for example, straw, weeds, cob fragments, etc., will be moved by the remaining auger flight convolutions and discharged from the outer open end of the sifting and separating body onto the chute plate 8 for suitable disposal or possible usage.

The sifted and separated grains or kernels, aforesaid, are received by the trough 23 from which they are discharged into receiving means (not shown).

Should the machine body 1 be provided with an auger-flight carried imperforate drum 25, as shown in FIGURE 1 of the drawings, it will be understood and appreciated that it will function to improve the longitudinal travel of those matters being sifted and separated, lessening if not eliminating flow inertia.

The invention may be embodied in still other specific forms, without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are therefore intended to be embraced therein.

I claim:
1. In combination with a machine for separating and sifting substantially dry flowable matters of different characters and sizes, including a frame supported rotatable foraminated shell-like body having endwise opposed matter receiving and discharge ways and a continuous spiral flight within and extending throughout its length and rotatable therewith:
   (a) a frame of cross-sectional shape and size corresponding to that of the machine frame connected to that end thereof adjacent the shell-like body discharge way;
   (b) a second foraminated shell-like open ended body rotatably supported within the second mentioned frame connected to and rotatable with the machine foraminated body;
   (c) a continuous spiral flight within and connected to the second body extending throughout the length thereof, the inner end of which is in apposed relation to and communicates with the adjacent end of the first mentioned spiral flight;
   (d) the distances between the centers of the outer convolutions of the second spiral flight being successively decreased toward the open outer end of the second mentioned foraminated body,
   (e) a longitudinally disposed non-foraminated shell-like open ended body of cross-sectional size less than that of said second foraminated shell-like body received and supported in spaced relation thereto;
   (f) relatively spaced bucket blades fixedly carried between the inner convolutions of the second flight adjacent and abutting the non-foraminated body, and
   (g) other relatively spaced bucket blades fixedly carried by and adjacent the walls of said second foraminated shell-like body between the outer convolutions of the second spiral flight outwardly of the first mentioned bucket blades.

2. The structure of claim 1 further characterized in that the machine frame has a longitudinally disposed drive shaft mounted therein supporting the first mentioned shell-like body;
   (a) that a longitudinally disposed driven shaft is journalled in bearings in the second mentioned frame and is connectable to said drive shaft whereby to be driven thereby;
   (b) that a plurality of relatively spaced supporting spiders are mounted on the driven shaft;
   (c) that longitudinally disposed bars are carried on the ends of the spiders receiving and supporting the second mentioned foraminated body thereabout, the inner end portions of which are extended and interengageable with the adjacent end portions of the machine foraminated body.

References Cited

UNITED STATES PATENTS

| | | | |
|---|---|---|---|
| 315,523 | 4/1885 | Lynett | 209—294 |
| 1,533,997 | 4/1925 | Stinson | 209—296 XR |
| 1,761,346 | 6/1930 | Jelbart | 209—293 XR |
| 2,047,808 | 7/1936 | Trimbey | 209—297 |
| 2,705,560 | 4/1955 | Bradshaw | 209—293 |
| 2,711,824 | 6/1955 | Ehrler | 209—298 |
| 2,942,731 | 6/1960 | Soldini | 209—293 |
| 3,122,499 | 2/1964 | Witzel | 209—283 XR |

FOREIGN PATENTS

| | | |
|---|---|---|
| 336,252 | 10/1930 | Great Britain. |
| 95,207 | 3/1939 | Sweden. |
| 759,704 | 10/1956 | Great Britain. |
| 489,970 | 1/1954 | Italy. |

FRANK W. LUTTER, Primary Examiner

U.S. Cl. X.R.

209—298, 406